(12) United States Patent  
Buard

(10) Patent No.: US 6,384,329 B2  
(45) Date of Patent: May 7, 2002

(54) END CAP FOR CLOSING TRUNKING FOR ROUTING ELECTRICAL CONDUCTORS OR CABLES

(75) Inventor: Yvon Buard, Le Pont (FR)

(73) Assignees: Legrand; Legrand SNC, both of Limoges (FR)

( * ) Notice: Subject to any disclaimer, the term of this patent is extended or adjusted under 35 U.S.C. 154(b) by 0 days.

(21) Appl. No.: 09/790,511

(22) Filed: Feb. 23, 2001

(30) Foreign Application Priority Data

Feb. 24, 2000 (FR) .............................. 00 02331

(51) Int. Cl.$^7$ ................................. H02G 3/04
(52) U.S. Cl. .................. 174/48; 174/68.1; 174/68.3; 174/72 A; 174/97; 439/207
(58) Field of Search .................. 174/48, 49, 68.1, 174/68.3, 72 A, 72 R, 96, 97; 439/207; 52/220.3

(56) References Cited

U.S. PATENT DOCUMENTS 4,091,231 A * 5/1978 Sotolongo .................... 174/48
4,952,163 A * 8/1990 Dola et al. ............... 439/207 X
5,595,494 A * 1/1997 Wiebe ....................... 174/48 X
5,929,380 A * 7/1999 Carlson et al. ............. 174/68.3
5,981,872 A * 11/1999 Decore et al. ................ 174/48
6,062,267 A * 5/2000 Fleming ..................... 138/114
6,274,814 B1 * 8/2001 Iavarone .................... 174/68.3

FOREIGN PATENT DOCUMENTS

EP          0 908 991          4/1999

* cited by examiner

Primary Examiner—Dean A. Reichard  
Assistant Examiner—Dhiru R Patel  
(74) Attorney, Agent, or Firm—Young & Thompson

(57) ABSTRACT

An end cap for closing one end of trunking, the end cap having a closure part for closing an interior space of the trunking and a fixing part for fixing it to a back of a base section of the trunking. The closure and fixing parts are connected together by a connecting part. The connecting part constitutes an elastic coupling which allows the closure part to move relative to the fixing part.

12 Claims, 4 Drawing Sheets

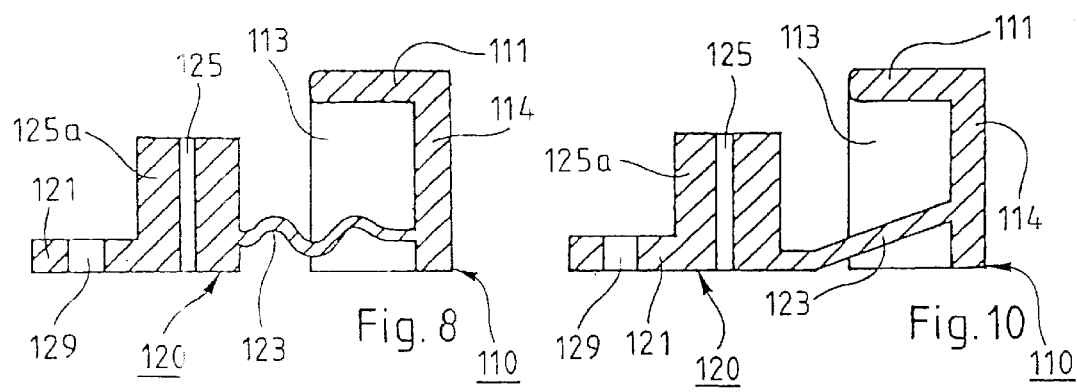
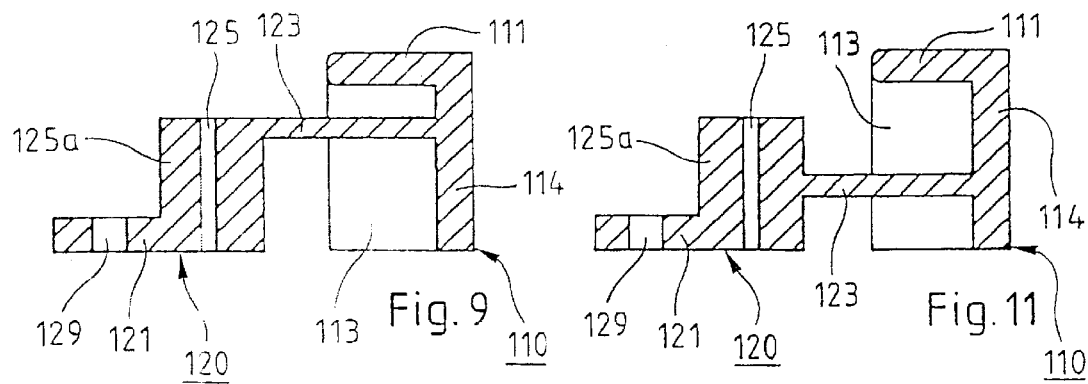

END CAP FOR CLOSING TRUNKING FOR ROUTING ELECTRICAL CONDUCTORS OR CABLES

BACKGROUND OF THE INVENTION

1. Field of the Invention

The present invention relates to an end cap for trunking of the type used, for example, to support, house and protect various devices, and in particular various electrical devices, and to support, house and protect electrical conductors or cables connected to those devices.

2. Description of the Prior Art

The present invention relates more particularly to an end cap having a closure part for closing the interior space of the trunking and a fixing part for fixing it to the back of the base section of the trunking, the closure and fixing parts being connected together by a connecting part.

An end cap of the above kind is designed to protect the end of the trunking against impact and, most importantly, to protect persons from the electrical cables or conductors inside the trunking.

The two functions are combined when it is required to prevent the insertion of foreign bodies such as wires, pins or screwdrivers into the trunking.

An end cap of the above kind also has an esthetic function, in particular by providing a harmonious transition between the outside surface of the trunking and that of the support to which the trunking is fixed.

Conventional end caps are in two parts, namely a support and a cover.

This achieves a good esthetic effect thanks in particular to the cover of the end cap covering the cut end of the closure cover section of the trunking.

However, fitting these end caps to the end of trunking is relatively complex and becomes difficult if the end of the trunking to be closed is in a corner of a wall.

Also, making an end cap in two separate parts is relatively costly.

A one-piece end cap, i.e. a support and a cover molded in one piece, is also known in the art. To be able to fix an end cap of this kind correctly to the back of a trunking base section, it must be positioned before fitting the closure cover section of the trunking. Because the end cap must generally cover a cut end of the closure cover section, it is not always easy to fit it after fixing the one-piece end cap to the back of the base section of the trunking. It can even be impossible if the trunking portion in question is relatively short.

One essential object of the invention is therefore to provide an end cap which is still economical to manufacture but which can be mounted on the trunking particularly simply and quickly.

SUMMARY OF THE INVENTION

To achieve the above object, the invention proposes an end cap for closing one end of trunking, the end cap having a closure part for closing an interior space of the trunking and a fixing part for fixing it to a back of a base section of the trunking, the closure and fixing parts being connected together by a connecting part, wherein the connecting part constitutes an elastic coupling which allows the closure part to move relative to the fixing part.

The end cap can therefore be made in one piece and is quick to fit, whilst providing improved mechanical strength, especially in the event of an impact. This is advantageous.

It is simple to fit to the base section of the trunking, either by inserting the end cap in a direction perpendicular to the mounting wall, which enables it to be fitted in places where access is difficult, or by threading it over the end of the base section of the trunking in the conventional way.

Thanks to the end cap according to the invention, it is easy to fit the closure cover section of the trunking after the end cap has been fitted to the base section of the trunking.

In this case, it simply suffices to move the closure part slightly away from the fixing part fixed to the base section of the trunking, in order to fit the closure cover section of the trunking, after which the closure part of the end cap returns elastically to cover the cut end of the closure cover section to provide a secure closure and to improve the esthetics of the closed trunking assembly.

Other non-limiting and advantageous features of the end cap according to the invention are as follows:

- the elastic coupling allows slight movement of the closure part relative to the fixing part in translation in a longitudinal direction of the trunking;
- the elastic coupling forms a hinge allowing slight angular movement of the closure part relative to the fixing part;
- the fixing part, the closure part and the elastic coupling are molded in one piece from plastics material;
- the closure part includes a closure wall for closing the interior space of the trunking and a cover portion for covering a cut end of the closure cover section of the trunking and the closure wall and the cover portion are molded in one piece;
- the elastic coupling includes at least one corrugated tongue which has one end connected to the fixing part and the other end connected to the closure part;
- the corrugated tongue has corrugations on opposite sides of a longitudinal vertical plane;
- the corrugated tongue has corrugations on opposite sides of a longitudinal horizontal plane;
- the elastic coupling is a flexible tongue which extends generally obliquely between the fixing lug and the closure part;
- the elastic coupling is a flexible tongue which extends in a horizontal plane along a longitudinal axis of the trunking from a base of the closure part to a base of the fixing part;
- the elastic coupling is a flexible tongue which extends in a horizontal plane along a longitudinal axis of the trunking in a heightwise direction relative to the base section of the trunking;
- the elastic coupling is obtained by molding a flexible plastics material, the closure and fixing parts are obtained by molding a rigid plastics material and their combination forms a one-piece component.

The following description, which is given with reference to the accompanying drawings, which are provided by way of non-limiting example, explains in what the invention consists and how it can be put into effect.

BRIEF DESCRIPTION OF THE DRAWINGS

FIGS. 8 to 11 are diagrammatic views in a vertical plane of four different embodiments of the end cap according to the invention.

DETAILED DESCRIPTION OF THE PREFERRED EMBODIMENTS

Figure 1:
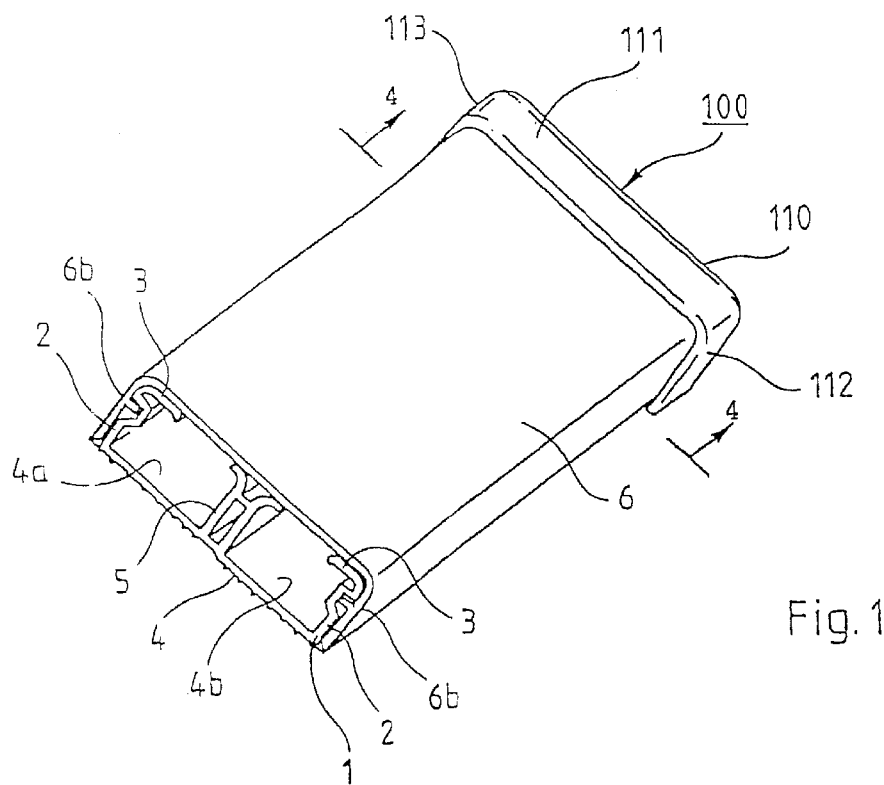
FIG. 1 is a side perspective view of a portion of trunking closed at one end by an end cap according to the invention.

Note that identical or similar parts of the various embodiments of the invention are as far as possible designated by the same reference symbols in all the figures and are not described again each time. FIG. 1 shows trunking 1 with small dimensions, also referred to as a molding, designed for routing electrical cables or conductors.

The molding 1 includes a base section having a back 4 flanked by two longitudinal lateral flanges 2, this example of the base section having a generally U-shaped cross section. This is known in the art.

In this embodiment, the longitudinal lateral flanges 2 of the base section of the trunking have rims 3 facing toward each other in a plane substantially transverse to the lateral flanges 2.

The base section of the trunking is divided into two longitudinal compartments by a longitudinal central wall 5 having divergent rims at its free edge, each rim being directed toward the rim 3 of one longitudinal lateral flange 2 of the base section of the trunking.

Thus the back 4 of the base section of the trunking 1 is divided into two parts 4a, 4b; each compartment is generally U-shaped in cross section.

The trunking 1 is closed by a closure cover section 6 which has upstanding edges that cover the outside surfaces of the longitudinal lateral flanges 2 of the base section of the trunking.

Of course, in a different embodiment, not shown, the closure cover section of the trunking 1 could have straight edges engaged in longitudinal grooves provided on each of the rims of the longitudinal lateral flanges of the trunking.

One end of the trunking 1 shown in FIG. 1 is closed by an end cap 100.

The end cap is designed to protect the end of the trunking against impact and most importantly to prevent access from that end to the electrical cables or conductors inside the trunking or the insertion into the trunking of foreign bodies such as wires, pins, screwdrivers, etc.

The end cap 100 also improves the esthetics of the trunking by providing a harmonious transition between the outside surface of the cover section covering the base section of the trunking and the support to which the trunking is fixed.

That support can be a vertical inside or outside wall.

A first preferred embodiment of the end cap 100 will now be described with reference to FIGS. 2 to 5.

The end cap 100 shown in those figures has a closure part 110 and a fixing part 120 for fixing it to the back of the base section of the trunking.

The closure part 110 includes a wall 114 for closing the interior space of the trunking and a cover portion 111 designed to cover a section of the closure cover section 6 of the trunking (see FIG. 1 in particular).

To this end, the cover portion 111 of the closure part 110 of the end cap 100 includes upstanding rims 112, 113 covering the upstanding rims 6a, 6b of the closure cover section 6 of the trunking 1.

The cover portion 111, 112, 113 and the closure wall 114 of the closure part 110 of the end cap are in one piece.

The end cap 100 further includes a fixing part 120 for fixing it to the back 4 of the base section of the trunking.

The fixing part 120 and the closure part 110 of the end cap are molded in one piece from one or more plastics materials.

The fixing part 120 includes two lugs 121, 122 and each lug is intended to engage in one compartment of the trunking 1 and to be pressed against the back 4a, 4b of the compartment.

Figure 4:
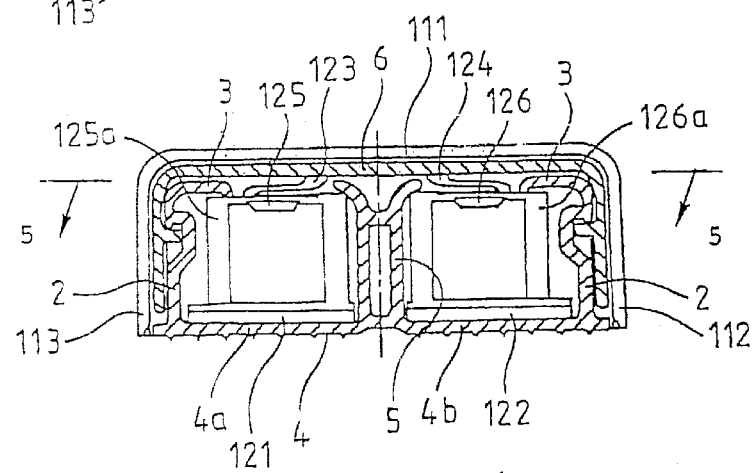
FIG. 4 is a view of the trunking shown in FIG. 1 in section taken along the line 4—4.

An end region of each of the lugs 121, 122 has, on the same side as the closure part 110, a chimney 125, 126 which is substantially perpendicular to the lug, and more particularly perpendicular to the back 4a, 4b of the base section of the trunking, and whose height is advantageously substantially equal to the depth of the base section of the trunking (see FIG. 4 in particular).

Each chimney 125, 126 is formed by a cylindrical pipe and receives a nail for fixing each of the lugs to the wall supporting the trunking.

The nail passes through the base section of the trunking and is anchored in the wall supporting the trunking.

The upper end of each of the chimneys 125, 126 into which a nail is inserted is advantageously flush with the tops of the longitudinal lateral flanges 2 of the trunking 1.

Thus when nailing each of the lugs to the base section of the trunking, the chimney limits the stroke of the hammer, which prevents clumsy damage to a flange of the base section of the trunking.

This is particularly advantageous in the case of trunking with small dimensions, in which the space inside the trunking is relatively restricted and it is difficult to obtain access to the back of the base section for nailing a lug to the back of the base section.

In the example shown in FIGS. 2 to 5, each chimney 125, 126 is formed in a relatively massive part forming a kind of boss at the end of each of the fixing lugs 121, 122.

Also, each of the fixing lugs 121, 122 is joined to the closure part 110, more particularly to the closure wall 114, by a connecting part 123, 124.

Each chimney 125, 126 is situated at the junction between the connecting part 123, 124 and the lug 121, 122.

In the embodiment shown in FIGS. 2 to 5, each connecting part 123, 124 takes the form of a corrugated branch or tongue.

One end of the branch or tongue is connected to the closure wall 114 of the closure part 110 and the other end is connected to the outside surface 125a, 126a of the relatively massive part in which each chimney 125, 126 is formed.

The corrugations of each branch or tongue 123, 124 constituting a connecting part is formed on either side of a vertical plane extending along an axis X1 or X2 parallel to the longitudinal axis X of the end cap, which is also that of the trunking.

This kind of connecting part 123, 124 then constitutes an elastic coupling between the fixing part 120 and the closure part 110, enabling slight displacement of the closure part relative to the fixing part when the end cap is mounted on the end of the base section of the trunking.

This is particularly advantageous when, as shown in FIGS. 2 to 5, the closure part, the fixing part and the connecting part are molded in one piece from one or more plastics materials and the closure part includes a cover portion with upstanding rims, as previously described.

Accordingly, in this case, fitting the end cap to the base section of the trunking is relatively easy, even when access to the end of the base section of the trunking is difficult, which is the case when the end of the trunking is in a corner of a wall in particular.

When access to the end of the trunking is difficult, the fixing part of the end cap can be fitted to the back of the base section of the trunking in a direction substantially perpendicular to the axis X of the trunking.

When the location of the end of the trunking allows, the end cap can be threaded into the base section of the trunking along the axis X of the trunking.

The fixing part 120 of the end cap is nailed to the back of the base section of the trunking.

The closure part 110 of the end cap 100 is then moved in translation a short distance along the longitudinal axis of the trunking, toward the outside of the base section, so that the closure cover section of the trunking can easily be placed on it, with its cut end near the end of the trunking. The closure part is moved away from the fixing part of the end cap to facilitate fitting the closure cover section of the trunking to it.

Finally, when the closure part reverts elastically to its original position, the cover portion of the closure part covers the cut end of the closure cover section fitted to the base section of the trunking.

The elastic coupling between the fixing part 120 and the closure part 110 of the end cap 100 also allows, in addition to movement in translation of the closure part relative to the fixing part, slight tilting of the two parts relative to each other.

Figure 5:
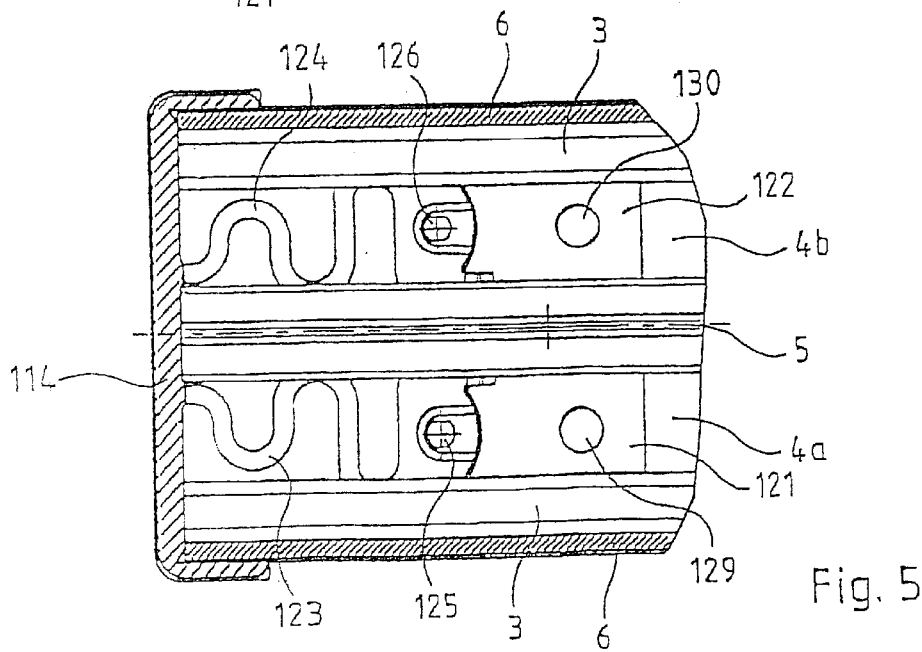
FIG. 5 is a view in section taken along the line 5—5 in FIG. 4.

As shown in FIGS. 4 and 5 in particular, when the end cap is fitted to the end of the base section of the trunking, the chimneys are perpendicular to the back of the base section and their upper ends are wedged under the rims 3 of the longitudinal lateral flanges 2 of the base section of the trunking.

The closure part closes the trunking transversely, with its cover portion covering an end part of the closure cover section of the trunking.

The end cap shown in FIGS. 2 to 5 can also be screwed to the base section of the trunking, of course, using two orifices 129, 130 provided at each of the free ends of the lugs 121, 122.

The facing inside longitudinal edges 127, 128 of each of the lugs 121, 122 include facing recesses 127a, 128a of part-circular shape and defining between them a housing for fastening the fixing part of the end cap to the base section of the trunking using a fixing member such as a plastics material wall plug.

This method of fixing can be envisaged only when the trunking has only one compartment, which is not the case with the trunking shown in the figures.

Different embodiments of the connecting parts 123, 124 constituting the elastic coupling between the fixing part 120 and the closure part 110 of the end cap 100 can be envisaged.

They include those shown in FIGS. 6 to 11.

Figure 6:
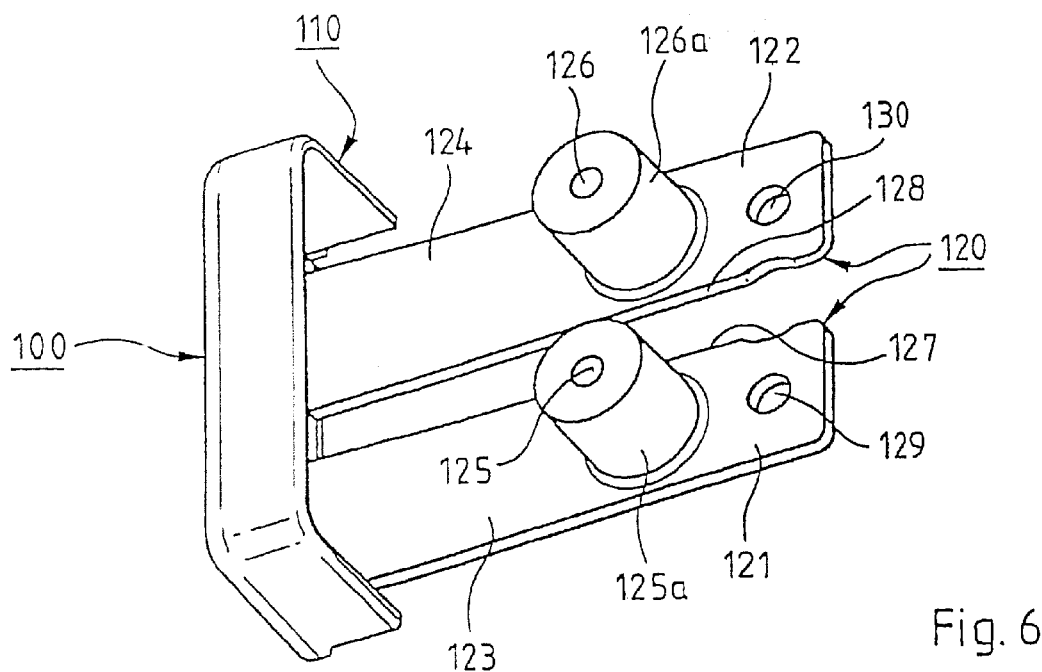
FIG. 6 is a perspective view of a second embodiment of an end cap according to the invention.

In FIG. 6, the connecting part 123, 124 of each lug 121, 122 connecting it to the closure part is an extension of the lug itself.

In this simplified embodiment, the outside wall of each chimney 125a, 126a is a circular cylindrical wall.

Figure 7:
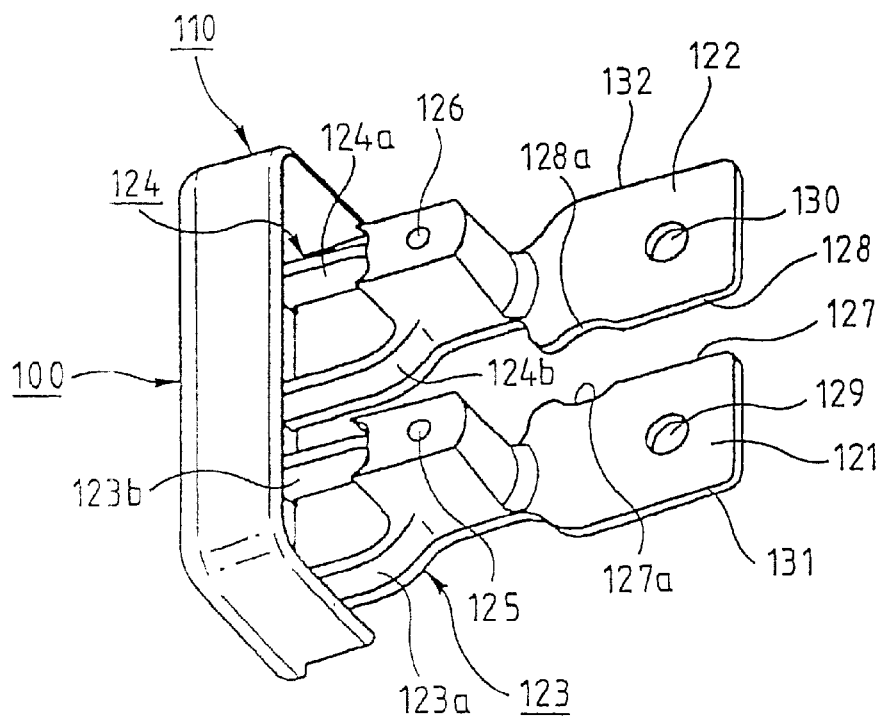
FIG. 7 is a perspective view of a third embodiment of an end cap according to the invention.

In the embodiment shown in FIG. 7 each connecting part 123, 124 of each lug 121, 122 connecting it to the closure part 110 has two branches 123a, 123b, 124a, 124b extending from one end of each lug 121, 122 (at which a chimney is situated) on either side of its longitudinal edges 127, 131, 128, 132, the branches 123a, 123b and 124a, 124b forming a kind of fork connecting the lug to the closure part 110.

In another embodiment shown in FIG. 8 in particular, the corrugated connecting part 123 of the fixing part 120 for fixing it to the closure part 110 has corrugations on each side of a longitudinal horizontal plane.

Each connecting part 123 can also consist of a tongue that extends in a generally oblique direction between the outside wall 125a of the chimney 125 and the closure part 110 as shown in FIG. 10.

In FIGS. 9 and 11 each connecting part 123 extends in the heightwise direction relative to each fixing lug 121 between an outside wall 125a of the chimney 125 and the closure part 110.

In FIG. 9 the connecting tongue 123 is at approximately the same height as the upper end of the chimney and in FIG. 11 the connecting tongue 123 extends approximately half the height between the fixing lug 121 and the upper part of the chimney 125.

To provide an elastic coupling between the fixing part 120 and the closure part 110 of the end cap according to the invention it is also possible to mold the connecting part in a plastics material that is flexible compared to the fixing part and for the closure part to be made from a rigid plastics material, so that the combination forms a two-material one-piece component.

Suitable plastics materials include flexible and rigid PVC.

The present invention is in no way limited to the embodiments described and shown, many variants of which conforming to the spirit of the invention will be evident to the skilled person.

Figure 2:
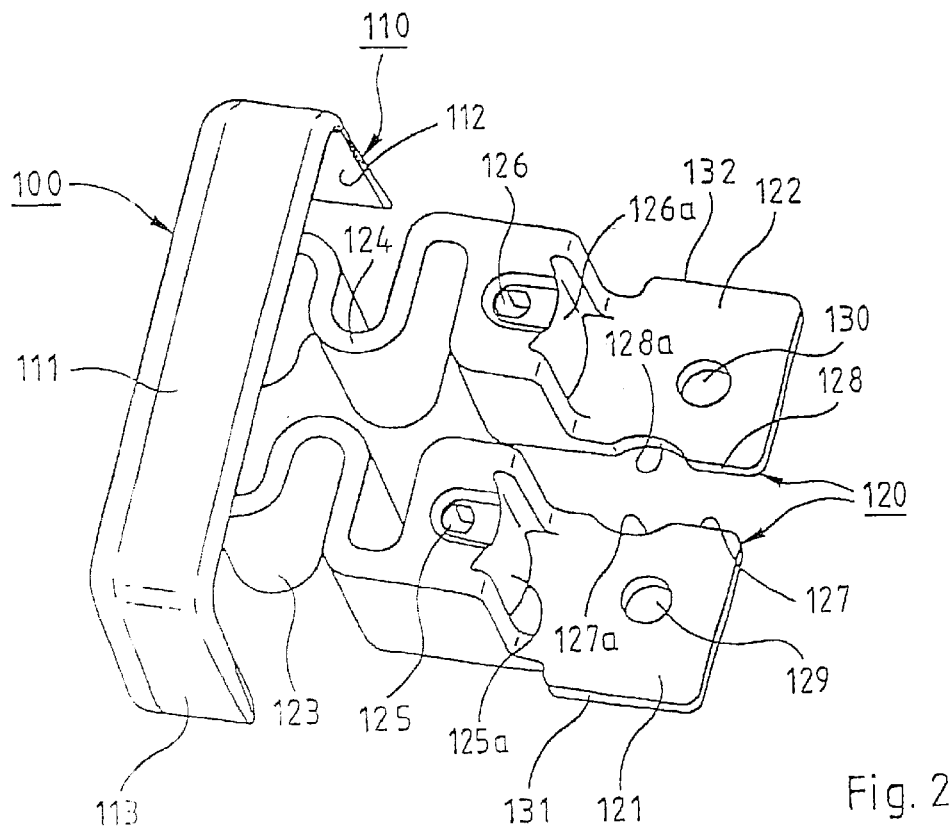
FIG. 2 is a top perspective view of a preferred embodiment of the end cap according to the invention.
Figure 3:
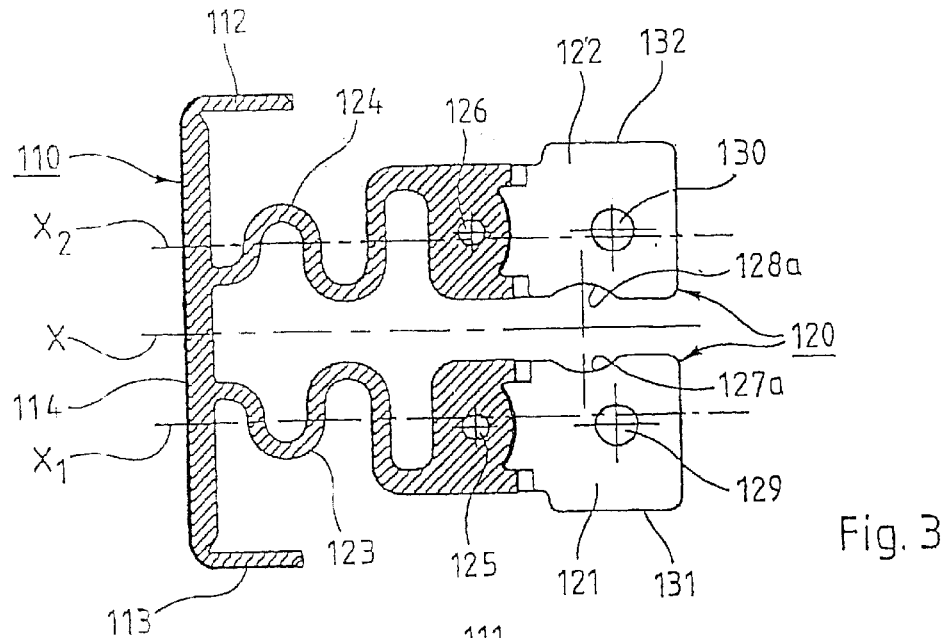
FIG. 3 is a view in section in a horizontal longitudinal plane halfway up the height of the end cap shown in FIG. 2.

In particular, a variant that is not shown comprises an end cap of the same type as that shown in FIG. 2 but having only one fixing lug (similar to one of the fixing lugs of the end cap shown in FIG. 2, for example), supporting a chimney and connected to the closure part by a corrugated connecting part forming an elastic coupling between the closure and fixing parts.

In another variant that is not shown an end cap of the same type as that shown in FIG. 2 includes a single fixing lug (similar to one of the fixing lugs of the end cap shown in FIG. 2) twice the width of the fixing lug of the end cap shown in FIG. 2 and supporting two identical parallel chimneys, the double-width fixing lug being connected to the closure part by two corrugated connecting parts forming elastic couplings and extending in parallel between the chimneys and the closure part, each of the connecting parts issuing from the outside wall of a chimney.

What is claimed is:

1. An end cap for closing one end of trunking, said end cap having a closure part for closing an interior space of said trunking and a fixing part for fixing it to a back of a base section of said trunking, said closure and fixing parts being connected together by a connecting part, wherein said connecting part constitutes an elastic coupling which allows said closure part to move relative to said fixing part.

2. The end cap claimed in claim 1 wherein said elastic coupling allows slight movement of said closure part relative to said fixing part in translation in a longitudinal direction of said trunking.

3. The end cap claimed in claim 1 wherein said elastic coupling forms a hinge allowing slight angular movement of said closure part relative to said fixing part.

4. The end cap claimed in claim 1 wherein said fixing part, said closure part and said elastic coupling are molded in one piece from plastics material.

5. The end cap claimed in claim 1 wherein said closure part includes a closure wall for closing the interior space of said trunking and a cover portion for covering a cut end of a closure cover section of said trunking and said closure wall and said cover portion are molded in one piece.

6. The end cap claimed in claim 1 wherein said elastic coupling includes at least one corrugated tongue which has one end connected to said fixing part and the other end connected to said closure part.

7. The end cap claimed in claim 6 wherein said corrugated tongue has corrugations on opposite sides of a longitudinal vertical plane.

8. The end cap claimed in claim 6 wherein said corrugated tongue has corrugations on opposite sides of a longitudinal horizontal plane.

9. The end cap claimed in claim 1 wherein said elastic coupling is a flexible tongue which extends generally obliquely between a fixing lug and said closure part.

10. The end cap claimed in claim 1 wherein said elastic coupling is a flexible tongue which extends in a horizontal plane along a longitudinal axis of said trunking from a base of said closure part to a base of said fixing part.

11. The end cap claimed in claim 1 wherein said elastic coupling is a flexible tongue which extends in a horizontal plane along a longitudinal axis of said trunking in a heightwise direction relative to said base section of said trunking.

12. The end cap claimed in claim 1 wherein said elastic coupling is obtained by molding a flexible plastics material, said closure and fixing parts are obtained by molding a rigid plastics material and their combination forms a one-piece component.

* * * * *